United States Patent
Henry

[15] 3,676,401
[45] July 11, 1972

[54] ENVIRONMENTALLY DISINTEGRATABLE PLASTIC COMPOSITIONS COMPRISING COPOLYMERS OF ETHYLENE AND CARBON MONOXIDE AND A DEGRADATION ACCELERATOR

[72] Inventor: James William Henry, Kingsport, Tenn.

[73] Assignee: Eastman Kodak Company, Rochester, N.Y.

[22] Filed: Oct. 30, 1970

[21] Appl. No.: 85,784

Related U.S. Application Data

[63] Continuation-in-part of Ser. No. 849,265, Aug. 4, 1969, abandoned, Continuation of Ser. No. 411,354, Nov. 16, 1964, abandoned.

[52] U.S. Cl. .................260/63 CQ, 161/247, 260/23 R, 260/94.9 R, 260/94.9 B, 264/148, 264/150, 264/176 R, 264/328
[51] Int. Cl. .................C08f 3/40, C08f 13/04
[58] Field of Search .................260/63 CO, 94.9 R, 94.9 B, 260/23 R

[56] References Cited

UNITED STATES PATENTS

| | | | |
|---|---|---|---|
| 2,495,286 | 1/1950 | Brubaker | 260/63 |
| 3,083,184 | 3/1963 | Loeb | 260/63 |
| 3,274,158 | 9/1966 | Tocker | 260/62 |

FOREIGN PATENTS OR APPLICATIONS

| | | | |
|---|---|---|---|
| 1,128,793 | 10/1968 | Great Britain | 260/63 |

Primary Examiner—William H. Short
Assistant Examiner—L. L. Lee
Attorney—Cecil D. Quillen, Jr. and Charles L. Good

[57] ABSTRACT

Compositions comprising (1) a copolymer of ethylene and 0.1 percent to 18 percent by weight of carbon monoxide, said percentage range being the proportion of carbon monoxide in the copolymer, and (2) an ultraviolet light degradable amount of an organometallic compound or salt of a common metal, e.g., ferricine, cobalt acetyl acetonate, etc., whereby film, articles of manufacture and especially packaging means, upon exposure to ultraviolet rays emitted by the sun are capable of accelerated deterioration thereby causing such materials including packaging means to decompose forming dust or flakes which may become embedded in the soil or carried away by rain water under those circumstances where they are thrown away out of doors so as to be exposed to natural environmental conditions.

14 Claims, No Drawings

3,676,401

ENVIRONMENTALLY DISINTEGRATABLE PLASTIC COMPOSITIONS COMPRISING COPOLYMERS OF ETHYLENE AND CARBON MONOXIDE AND A DEGRADATION ACCELERATOR

This application is a continuation-in-part of Ser. No. 849,265, filed Aug. 4, 1969, and now abandoned and, which is a streamlined continuation of Ser. No. 411,354, filed Nov. 16, 1964, and abandoned.

This invention relates to a disintegrating or readily disintegrable plastic which may advantageously be shaped into wrapping material, molded cups, or various other utilitarian forms. More particularly, this invention concerns a disposable, decomposable antilitter packaging means or containers formed of polymeric materials susceptible to rapid decomposition and outdoor weathering.

The disturbing condition of foil wrappers, paper wrappers and other currently used wrapping material littering the countryside is sufficiently well known as not to require extended comment. However, considerable progress has been accomplished by the way of education against littering and with numerous warning signs and posters to alleviate such situation. Nevertheless, there are still instances where waste receptacles may be accidentally overturned and pieces of waxed or oiled paper wrappers, foils or similar material are carried by the wind into vacant lots where such material remains as an eyesore for extended periods. Or, with such dispersed waste material extra expense may be entailed for workmen to make trips to such areas for pickup of the discarded items.

Another type of problem experienced by the public concerns drinking glasses and paper cups or the like in motels and similar places. While, as well known, many such containers with considerable care and expense are sterilized and wrapped, usually such wrappings are not hermetically sealed Hence, it is not possible by visual inspection to ascertain of a particular cup in fact may have been dropped on the floor, used or otherwise rendered nonsterile and then inadvertently or otherwise reinserted in the cup dispenser.

In further detail, the development of prepackaged foods and the tendency of food vendors to package prepared hot foods for carrying away from the place of vending before these foods are consumed, has resulted in a disposal problem for the packaging materials used to contain these foods. Unfortunately, the solution to this problem on the part of some consumers is to deposit the wrappings on the roadways, parkways, or lawns of the area where he happens to be when he completes consumption of the food product. The resulting litter either must be manually cleared away in order to maintain the appearance of these areas, or it may, in some cases, be left to blow away. This latter solution to the cleanup problem is one which results in unsightliness and also may present a health hazard.

Accordingly, it seems apparent that the development of a material which obviates or minimizes the aforesaid type of problem represents a highly desirable result. After extended investigation of various plastic compositions I have discovered plastic materials which have special utility for minimizing or obviating difficulties as aforesaid as will be explained in detail hereinafter.

This invention has for one object to provide a disintegrable or disintegrating type plastic. A particular object is to provide such plastic in the form of wrapping material, cups or various other articles of manufacture which while satisfactorily functionable during their short period of use will disintegrate relatively quickly after use. A further object is to provide methods of fabrication for such plastic into articles of manufacture which are desired to disintegrate after use. Other objects will appear hereinafter.

According to some broader aspects of my invention I have discovered a packaging or containing material and elements therefrom which may be made from this material in which the problem of disposal after the product has been used by the consumer of the food or other products contained therein is accomplished by the effect of sunlight, directly or by sunlight diffused through clouds or other forms of diffusion, reflection or transmission of sunlight, upon the material comprising the packaging. Specifically, recognizing that disposal of litter left by consumers of packaged foods often is left to nature to cause dissipation of the litter by decay or other natural means, I have devised a package based upon the natural frailties which can be deliberately introduced into certain polymeric substances so that the effects of weather upon these substances is that of accelerating decomposition of these materials containing a degradation causing amount of certain constituents in these substances.

More specifically, I have discovered that certain polymers, more generally those classed as the polyolefins, are quite susceptible to the effects of ultraviolet light irradiation, and that the effect of such irradiation is to cause rapid embrittlement and cracking with ultimate decomposition. Having this knowledge relating to the effects of ultraviolet light upon the polyolefin classes of polymeric materials, I have devised packaging and containers of such materials. This packaging is constructed of classes of the polyolefin polymers which are selected for the rapidity of failure when irradiated by ultraviolet light. The rate of destruction of the polymer by the irradiation is chosen to be compatible with the end use of the packaging, a generally practical time limit for decomposition to the point of the package presenting no objectionable appearance on the areas littered being chosen as 14 days. Greater or lesser times may be chosen, the selection of materials being made upon the considerations governing the time choice.

In the practice of my invention, I have found that homopolymers of the olefins, as well as copolymers having an olefin base, offer satisfactory materials having the desired decomposition potential. For example, a copolymer of ethylene and 12 percent carbon monoxide exhibits decomposition after one week of exposure to natural sunlight which would result in the objects made of this material being pulverized by the action of a rotary lawn mower or by normal tumbling in the wind and rain. Longer exposure will result in greater decomposition of the material.

Some of the useful copolymers of ethylene and carbon monoxide are disclosed in Combs et al Ser. No. 687,103, filed Dec. 1, 1967, appearing in the Official Gazette on Dec. 28, 1969, as Defensive Patent Publication Q687103; and Combs et al also disclose a process for making such copolymers which are heat stable, ultraviolet light unstable copolymers of ethylene and carbon monoxide having a carbon monoxide content (based on the moles of copolymer) of about 7 to 29 mole percent, an inherent viscosity of about 0.4 to about 1.8 and a melt index of about 0.1 to about 100.

Further experiments which show equal potential as decomposing products have used ethylene with 6 and 8 percent carbon monoxide as the copolymerizing compound. In addition to a copolymer such as this described above, I have found that the homopolymer of propylene exhibits potential as a decomposing material for the purpose which I have described. In this case, depending upon the processing of the polymer, periods in excess of one month are required to allow the ultraviolet irradiation by the sun to produce decomposition. I have found further that mixtures of ethylene and propylene homopolymers tend to be decomposed rapidly by the irradiation of the sun's ultraviolet spectrum. The rates of decomposition again vary depending upon the preparation of the polymers, but decomposition in some degree can usually be achieved after about one month's irradiation by the sun's light.

While the polyolefin plastics are preferred, there are other polymeric materials which exhibit somewhat comparable tendencies to decompose when irradiated by sunlight. Here again, the rates of decomposition are governed by the steps taken in the preparation of the polymers and by the various additives which can be incorporated into the polymers which will effect more rapid decomposition of the materials in sunlight. For this reason, the concept herein of a material in which the action of sunlight will cause decomposition of the material after a reasonable period has elapsed, is not limited to the use of polyolefins or copolymers or olefins and other compounds. In the development of polymer chemistry there have been other polymers devised which have proven "unsatisfactory" regarding their ability to withstand the action of sunlight. My invention makes a virtue of this so-called weakness in that by suitable chemical control in the manufacture of the polymer, the period of time which the polymer can withstand irradiation by the sun before decomposing can be controlled.

While I have described polymers exhibiting decomposition due to irradiation by the sun as the preferred polymeric material for construction of my invention of the decomposable wrapping or containing material, other polymers which can be decomposed from their solid state so that litter may be obliterated from a given area by the action of the weather can be used in the practice of my invention. An example of a suitable film, is a sheeting formed of poly(vinyl alcohol). This polymer is known to be soluble in water, thereby insuring that after a satisfactory number of inches of rainfall have fallen in the area in question, the sheeting formed of this polymer will have dissolved and seeped into the earth.

As an example of variation within the decomposition rate for irradiation by ultraviolet of copolymers of ethylene containing up to 1 percent by weight of carbon monoxide in the copolymer, I cite the following table:

| Carbon Monoxide in Feed Gas, % | Weather-ometer embrittlement Time for 3-Mil Film, Hr. |
|---|---|
| None | 655 |
| 0.1 | 528 |
| 05 | 316 |
| 1.0 | 198 |

As I have pointed out above, concentration of carbon monoxide gas in greater amounts results in even less weathering stability of the copolymer prepared from ethylene and carbon monoxide. Concentrations of 12% CO in the copolymer results in weathering time of the order of 40 hours or less. The range may be from about 0.1 percent (see table above) to about 18 percent (see original claim 3 of first filed application, Ser. No. 411,354) by weight in the copolymer, based on the weight of the copolymer.

Organometallic compounds such as ferricine can be added which will result in accelerated oxidation of the polymer. Further, salts of iron, copper, manganese, and other common metals have the effect when blended with the polymer or copolymer of accelerating oxidation of the material when it is exposed to sunlight. Addition of salts of this type results in many combinations of additive and polymer which are satisfactory in the application of my invention.

According to one aspect of this invention, as set forth in original claim 1 of Ser. No. 411,354, there is provided as a new article of manufacture a packaging material in the form of a cup, a cone, a bag, a wrapping sheet, a box and the like, said articles being formed of a polymeric material chemically devised that the material as it exists in the unused and unexposed state, has physical properties suitable for bagging, sheeting, boxing and the forming of cups of tough mechanically durable nature, which articles, after having been employed for their intended purpose, may be discarded in an outdoor area exposed to sunlight, whereupon the irradiation of said articles by the ultraviolet rays emitted by the sun will activate accelerated deterioration of the polymeric materials comprising said articles thereby causing said articles to decompose forming dust, or flakes and the like which may become embedded in the soil or carried away by rain water runoff.

According to a further aspect of this invention, as set forth in original claim 3 of Ser. No. 411,354, there is provided such articles formed of a copolymer formed by reacting ethylene with carbon monoxide in proportions ranging from 1 percent by weight to 18 percent by weight.

According to another aspect of this invention, as set forth in original claim 4 of Ser. No. 411,354, there is provided articles containing an additive of metallic salts known to accelerate degradation when irradiated with sunlight.

According to an additional aspect, as set forth in original claims 8 and 9 of Ser. No. 411,354, the amount of carbon monoxide in the copolymer is such that it will disintegrate in a predetermined short time period when exposed to ultraviolet light, and according to claim 10, the plastic material may contain a salt of a metal from the group of iron, copper and manganese. The use of cobalt compounds is exemplified in Example III below and the use of organometallic compounds (ferricine, nickelosine or the like) and salts of common metals has already been mentioned hereinabove. Examples well known in the art relating to such compounds include:

1. Metal salt of mono or polycarboxylic acids (R'COO metal)

The carboxylic acid component (R'COO where R' is a hydrocarbon radical advantageously containing from one to 17 carbon atoms) may be represented by the following acids: acetic, heptanoic, 2-ethylheptanoic, octanoic, myristic, oleic, stearic, linoleic, neodecanoic, naphthenic, tall oil acids, etc. The metal of the salt is advantageously selected from the group of copper, cobalt, iron, and manganese. Specific examples include cupric acetate, cobaltous propionate, cuprous oleate, ferric acetate, ferrous butyrate, nickel naphthenate, manganous tallate, copper oxalate, nickel sebacate, etc.

2. Metal acetylacetonates (Metal complex of $CH_3COCH_2OCOCH_3$)

The metal may be selected from group of copper, cobalt, iron, manganese, chromium, vanadium and nickel. Specific examples include the cobalt compound mentioned above and similar compounds of the other common metals.

3. Metal alkylacetoacetate (Metal complex of $CH_3COCH_2COOR''$)

The R'' group may advantageously contain from 2 to 20 C (hydrocarbon) and is represented by the following: allyl, ethyl, octyl, decyl, dodecyl, octadecyl, etc. The metal of the complex may be selected from the group of copper, cobalt, iron, manganese, nickel and zinc.

4. Metal complex of N,N'- salicylidene ethylene diamine

The metal may be selected from copper, cobalt, vanadium and manganese. Specific examples include the copper chelate and other metal chelates.

5. Metal 8-hydroxy quinolinate

The metal may be selected from copper, cobalt, zinc, vanadium and manganese. Specific examples include zinc 8-hydroxy quinolinate, etc.

6. Other organometallic compounds

Chromic chloride complex with stearic acid.
Chromic chloride complex with oleic acid.
Cobaltic chloride complex with oleic acid. Also, copper dust, a known pro-oxidant in polyolefins, would also be useful in this invention since its effect would be accelerated substantially by sunlight.

The packages which I have prepared which are constructed of disintegrating materials, may be of any physical form, however, I have specifically been concerned with packages to be used for foodstuffs or other items which are vended in packaged form and are intended to be consumed in areas where disposal of the package may generally create a littering problem. Items which are fitted for disposable use of this type are generally bags and wrapping sheets. In addition, cones, boxes and cups can be used in this type of vending operation. In such use, these items when they have fulfilled their function as a container or wrapper, may be discarded on the earth in outdoor locations. It is in these areas that disposal by normal deposit in a trash receptacle or by manual cleaning means becomes difficult.

With these packages made of materials of the present invention and which disintegrate by the action of the sun's rays or by other weathering action, the action of the weather will within a short time cause disappearance of the materials involved, thereby making special clean up of isolated areas unnecessary.

For further understanding of the present invention reference is made to the drawings of the aforesaid British Pat. No. 1,128,793 by the same inventor forming a part of the present application. In the drawings are diagrammatic views of various articles of manufacture such as sandwich packages, molded containers and the like for food or beverage products. A typical sandwich bag may be composed of the special plastic of the present invention. This bag may be of any conventional construction such as one having a closed end and open end which may be folded after the sandwich has been inserted. For example, a hamburger or other sandwich or like product is inserted into the bag at the open end and the open end folded or rolled up. Also, the plastic material of the present invention is useful in the form of a flat sheet on which, for example, there may be placed several slices of pickles, cheese or other similar products which are then wrapped in the sheet. The sheet may be employed somewhat in the nature of a napkin to temporarily protect the hands of the person from the product contained on the sheet, after which the sheet may be discarded.

The plastic of the present invention may also be molded into a cone of any conventional configuration adapted for the temporary supporting of ice cream, frozen custard or the like. Furthermore, the plastic of the present invention may be molded into a conventional drinking cup adapted for the temporary containing of water or the usual so-called soft drinks or heated beverages such as coffee.

According to certain embodiments of this invention there is provided an environmentally disintegratable plastic composition comprising (1) a copolymer of ethylene and carbon monoxide, the amount of carbon monoxide in the copolymer being sufficient to accelerate degradation upon exposure to ultraviolet light, and (2) an amount sufficient to accelerate degradation upon exposure to ultraviolet light of an organometallic compound or a salt of a common metal.

Advantageously, the amount of carbon monoxide in the copolymer is about 0.1—18 percent by weight based on the copolymer.

As indicated herein, embodiments of this invention may include those wherein the amount of carbon monoxide is sufficient whereby packaging means in the form of film or a molded article is capable of disintegration upon exposure to ultraviolet light emitted by the sun within a time period in the range between about 4 days and 2 weeks.

For a further understanding of my invention reference is made to the following examples:

EXAMPLE I

In accordance with this example disintegrating plastic sheeting in accordance with the present invention may be prepared utilizing readily available conventional sheet production equipment. That is, a standard screw type extruder for thermoplastics may be employed. The feed hopper of the extruder is supplied with a polymer of the present invention of the following composition where the percentages are based on the weight of the copolymer:

ethylene 92% carbon monoxide 8%

The copolymer is conducted from the feed hopper through the extruder where it is heated to a temperature of 450° F. In other words, the polymer of the present invention may be rendered flowable and moldable in the same type of equipment and in the same manner as thermoplastic polymers which heretofore have been fabricated into sheeting.

The flowable polymer of the present invention is extruded through a flat forming die of the following dimension and configuration:

| | |
|---|---|
| width | 42 inches |
| die opening | 30 mils which is 0.003 inch |

The sheeting exiting from the die is of approximately 40 inches width and 1 mil thickness and is taken up on a take-up roll in the usual manner but in the absence of any sunlight or other source of ultraviolet light. From this roll the wide sheet is slit into sections of 32 inches width, which sheeting material is then wound on a cardboard core and placed in a lightproof dispensing container. The dispensing container is of a known construction having a slit in the side of the container so that the desired amount of sheeting may be withdrawn and torn off from the main supply within the lightproof container.

Several portions of this sheeting are removed from the container and products simulating sandwiches and other similar items are wrapped with such sheeting. The resultant rest packages are placed in normal sunlight on a window shelf for approximately 2 days. The packages are checked at the end of the second say and found to be reasonably intact and to furnish enclosure protection such as protection from dust and dirt as well as moisture to the contents of the packages.

After the second day the contents are removed from the packages and the sheet wrapping left in the sunlight for 2 more days. At the end of the fourth day, upon picking up the wrappers, they are found to disintegrate into particles and powder.

EXAMPLE II

In another example using copolymer similar to Example I, tubing is extruded from a die so designed that a tube of disintegratable polymer is formed having a diameter of 6 inches and wall thickness of 1 mil. This tubing is flattened as it is withdrawn from the extrusion die. At intervals of 6 inches the tubing is sealed together by means of a heated sealing device. A shear device is utilized to sever the tubing at a point approximately one half inch from the sealed seam in the tubing. Bags formed from the tubing which is sealed at one end are used to enclose sandwiches. Upon insertion of the sandwich the bag is sealed by folding and twisting the open end. Bags so sealed are found to remain intact and flexible for a period of 24 hours of exposure to normal ultraviolet irradiation found in a room having glass windows of normal so-called double strength glass. Illumination of the room was by means of standard daylight type fluorescent lamps which were found to emit some ultraviolet light. After storage testing in the normal room environment the bags are exposed on a rooftop for a period of 2 days exposure to normal day sunlight. At the end of 5 days from the time the bag is removed from its protective shelf storage container, the bag is found to be embrittled to the point of becoming dust upon the slightest mechanical disturbance.

EXAMPLE III

In another example using copolymers similar to Example I, the copolymer of ethylene is altered in its ability of withstanding ultraviolet irradiation by the addition of one percent cobalt acetyl acetonate. The polymer is extruded into a sheet having a thickness of approximately one mil. This sheeting is formed into wrappers which are used to wrap sandwiches. Upon exposure of the wrapper to the normal light found within a room no deterioration is noted after a period of 2 days. The sheeting or wrapping is removed from the room and exposed out of doors to sunlight for a period of 2 weeks. At the end of the 2 week period it is found that the polymer has become embrittled and is subject to shattering into small particles when mechanically disturbed.

EXAMPLE IV

In accordance with this example plastic pellets of the composition of Example I are employed. These pellets are placed in the feed hopper of an injection molding machine for making molded cups. The fabricated cups are expelled from the molds of the machine in the absence of ultraviolet light. Such cups from high temperature molding at 375° F. are obviously in a sterile condition and are immediately inserted into a usual cylindrical cup dispenser of approximately 18 inches in length and 2½ inches in diameter. The top of the cup dispenser is covered not only for preventing dirt and dust access but precluding the influx of sunlight at that end. The lower end of the dispenser is open but the bottom of the cup is positioned somewhat above the dispenser bottom thereby protecting the bottom of the cup from excessive or premature light.

After the dispenser has been permitted to remain in a normally lighted room in which sunlight gains admittance through a single window for a period of 3 days the bottom cup is removed from the dispenser together with several other cups. These cups are filled approximately two-thirds full with water and found to satisfactorily retain the water for more than a two hour period. Several other cups are partially filled with conventional beverages including in three instances a heated beverage exemplified by coffee.

Over a several hour period the cups satisfactorily contained the beverage liquids in a manner comparable to presently used paper and plastic cups.

At the end of the day the contents from the cups are emptied and the cups are permitted to remain the the room for the next 40 hours where, during at least a portion of this period, the cups are exposed to further sunlight. Upon the end of this period an attempt to collect, stack and insert the cups back into the dispenser by forcing them into the bottom of the dispenser reveals that the cups have lost their strength and become crumbled when such attempt is made.

It is believed apparent, therefore, that such fabricated cup from my special plastic composition precludes or minimizes the possibility of nonsterile cups being existent in the area of the dispenser after the cups have been removed from the lightproof package in which the cups are brought to the dispenser or if previously removed from the dispenser.

EXAMPLE V

In another instance using a copolymer as in Example I a sheeting is formed by extrusion of a composition of ethylene 92 percent and carbon monoxide 8 percent and is cut into suitable sized sheets which are rolled into simple cone structures suitable for holding spun sugar confection. The extrusion operation is carried out at a temperature of 450° F. using a screw type extruder having a barrel 3.5 inches in diameter and a length to diameter ratio of 20:1. The die used has an active slit area of 42 inches and an opening of 30 mils whereby sheeting is extruded from this system having a thickness of approximately one mil. The sheeting is protected from prolonged exposure to ultraviolet light and is packaged as rapidly as a full roll is produced by wrapping in a light proof paper.

The finished roll of sheeting is cut into suitable sized sheets which are protected from prolonged exposure to ultraviolet light during and after this operation. Packaging of the sheets is done using ultraviolet light proof paper. Cone forming from the cut sheeting is done in an area protected from the ultraviolet light. The finished cones are protected after manufacture by enclosing them in light proof tube closed at each end by a light proof cap.

Spun sugar is collected on these tubes and then partially stripped from the tubes. The tubes are then exposed for 4 days to sunlight. At the end of 4 days it is found that the cones have become fragile due to decomposition to the point where mechanical crushing or breaking up by the wind or other moving force is sufficient to cause the material to fragment.

It is believed apparent from the foregoing examples and description that it will be seen that the present invention provides assistance in minimizing or obviating certain problems which have accompanied the use of prior art paper, foil and plastic materials in the fabrication thereof into wrapping and containing means. My invention may be modified and changed in certain manners exemplified by the following:

The decomposition of the packaging material due to ultraviolet light may be used as a means of releasing materials contained within the package after human or animal means of effecting such release has left the area where the package has been placed. An example of this type of usage would be delayed release of feed to animals in remote areas where means are required to assure that feeding is carried out over a period during which human assistance in dispensing the feed is not available. In this case the rate of decomposition may be controlled so that packages may be assigned for various periods of holding after being placed in the release area.

It will be further seen that it is not necessary that the packages which I have devised be formed wholly of the decomposable polymer. The polymer may be used as a coating over other materials which may in turn fall apart when the decomposable polymer is removed by decomposition. As an example, clay plates suitable for serving picnic dinners in the open may be molded. The clay when exposed to water would normally fall into particles which would blend with and enrich the earth. These dinner plates are glazed with a decomposable polymer of this invention. Upon exposure to the ultraviolet light of the sun for a suitable period after they have been used for dining, the polymer glaze decomposes allowing rainfall or other natural means to effect the disintegration of the clay plate body. All products of decomposition of the dinner plate are suitable to enrich or blend with the natural soil in the areas where the plate is designed to be used.

In another instance the decomposable polymer is used as a resistant waterproof finish for a metal can such as those used to contain beer. These cans when finished by more conventional finishes may remain in an exposed condition for years before the can finish has deteriorated sufficiently to allow rusting of the metal can body to take place. Using the decomposable polymer of this invention as a predominant constituent for a coating lacquer or melt coating, the can is thereby decorated and protected against moisture as long as it is protected from ultraviolet light. Upon exposure to sunlight in an open area the coating decomposes allowing rusting of the iron or steel base metal to take place.

Repeating the above examples of this invention with other amounts of carbon monoxide (e.g., 0.1%, 0.5%, 1%, 6%, 8%, 12% or 18%) in the copolymer or other amounts of the degradation accelerator (e.g., 0.001%, 0.01%, 0.1%, 2%, 5% or the like) in the composition produces results according to the invention which permit variations based upon the obvious inverse relationship between the need for any given amount of carbon monoxide and degradation accelerator.

This invention is quite unexpected in view of the fact, among other things, that U.S. Pat. No. 3,083,184 suggests that stable polymers are produced from the copolymerization of ethylene and carbon monoxide inasmuch as the patent gives no indication that articles made of such copolymers are subject to environmentally related degradation or disintegration. See also U.S. Pat. No. 2,495,286 as to such copolymers.

Although the invention has been described in detail with reference to preferred embodiments thereof, it will be understood that variations and modifications can be effected within the spirit and scope of the invention.

I Claim:

1. Environmentally disintegratable formed plastic product comprising
    1. a copolymer of ethylene and carbon monoxide, the amount of carbon monoxide in the copolymer being from about 0.1 percent to about 18 percent by weight based on total polymer weight, said carbon monoxide content being sufficient to accelerate degradation upon exposure to ultraviolet light, and
    2. from about 0.001 percent to about 5 percent by weight based on total polymer weight of an organometallic compound selected from the group consisting of copper oxalate, nickel sebacate, metal salts of monocarboxylic acids of the formula R'COO⁻ wherein R' is a hydrocarbon radical containing from one to 17 carbon atoms and the metal is selected from the group consisting of copper, cobalt, iron and nickel; metal acetylacetonate complexes of $CH_3COCH_2OCOCH_3$ wherein the metal is selected from the group consisting of copper, cobalt, iron, manganese, chromium, vanadium and nickel; metal alkylacetoacetate complexes of $CH_3COCH_2COOR''$ wherein the $R''$ group contains from 2 to 20 carbons and the metal is selected from the group consisting of copper, cobalt, iron, manganese, nickel and zinc; metal complexes of N,N'-salicylidene ethylene diamine wherein the metal is selected from the group consisting of copper, cobalt, vanadium and manganese; metal 8-hydroxy quinolinates wherein the metal is selected from the group consisting of copper, cobalt, zinc, vanadium and manganese; chromic chloride complex with stearic or oleic acid; cobaltic chloride complex with oleic acid; and copper dust, said organometallic compound content being sufficient to accelerate degradation upon exposure to ultraviolet light.

2. The composition of claim 1 wherein the amount of carbon monoxide is about 6–12 percent.

3. The composition of claim 1 wherein the amount of carbon monoxide is sufficient whereby packaging means in the form of film or a molded article is capable of disintegration upon exposure to ultraviolet light emitted by the sun within a time period in the range between about 4 days and 2 weeks.

4. The composition of claim 1 wherein the organometallic compound is ferricine.

5. The composition of claim 1 wherein the organometallic compound is cobalt acetyl acetonate.

6. The composition of claim 2 containing about 1 percent by weight of cobalt acetyl acetonate and the amount of carbon monoxide is 8 percent based on the weight of the copolymer.

7. The composition of claim 1 wherein the salt is a salt of iron.

8. The composition of claim 1 wherein the salt is a salt of copper.

9. The composition of claim 1 wherein the salt is a salt of manganese.

10. The composition of claim 1 wherein the amount of carbon monoxide is about 0.5 percent.

11. The composition of claim 1 wherein the amount of carbon monoxide is about 1 percent.

12. The composition of claim 1 wherein the amount of carbon monoxide is about 6 percent.

13. The composition of claim 1 wherein the amount of carbon monoxide is about 8 percent.

14. The composition of claim 1 wherein the amount of carbon monoxide is about 12 percent.

* * * * *